July 8, 1958     A. KAUFMANN     2,841,993
DRIVE FOR HAND POWER TOOLS

Filed Oct. 24, 1956     3 Sheets-Sheet 1

United States Patent Office 2,841,993
Patented July 8, 1958

2,841,993

DRIVE FOR HAND POWER TOOLS

Albert Kaufmann, Zuchwil, Switzerland, assignor to Firma Scintilla Ltd., Soleure, Switzerland Application October 24, 1956, Serial No. 618,155

Claims priority, application Switzerland October 25, 1955

7 Claims. (Cl. 74—50)

The present invention relates to hand power tools. More particularly, the present invention relates to drives for hand power tools.

Hand power tools such as those which carry reciprocatory cutting knives or saws are provided customarily with drives which include oppositely rotating gears carrying eccentrically arranged masses in order to compensate for unbalanced forces which arise during operation of the tool. In order to provide such oppositely rotating gears, it is customary to provide a transmission from a gear which rotates in one given direction to another gear which is driven by the transmission in an opposite direction of rotation. This transmission complicates the device undesirably, requires a space which necessitates making the housing of the drive larger than would otherwise be the case, and is an additional source of noise and trouble.

One of the objects of the present invention is to provide a hand power tool with a balanced drive arrangement which includes oppositely rotating gears but which does not include any transmission of the above type for driving one gear oppositely from another, so that the above drawbacks are eliminated.

Another object of the present invention is to provide a hand power tool with a structure capable of supporting movable drive elements in a very stable manner.

A further object of the present invention is to provide a drive of the above type which is capable of being arranged in such a way that elements such as the handle and work engaging parts of the tool may be spaced close to or relatively distant from each other.

An additional object of the present invention is to provide a structure capable of accomplishing the above objects and at the same time composed of a relatively small number of simple and rugged by constructed elements which are very reliable in operation.

With the above objects in view the present invention mainly consists of a hand power tool which includes a support means and a tool carrying means reciprocatorily carried by the support means. A drive is also carried by the support means and includes a drive shaft and a pinion fixed thereto for rotation therewith. A first gear having teeth directed outwardly away from the axis of the first gear is supported for rotation about its axis by the support means and has its teeth in mesh with the pinion. A second gear is also supported for rotation about its axis by the support means and has at its periphery teeth directed inwardly toward the axis of the second gear and also meshing with the pinion, the teeth of the second gear meshing with the pinion at a side thereof opposite from the side of the pinion which meshes with the first gear. In this way, the two gears are rotated in opposite directions without the use of any special transmission between these gears to effect oppositely directed rotations thereof. A suitable motion transmitting means interconnects the second gear with the tool carrying means in order to reciprocate the latter during rotation of the second gear.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
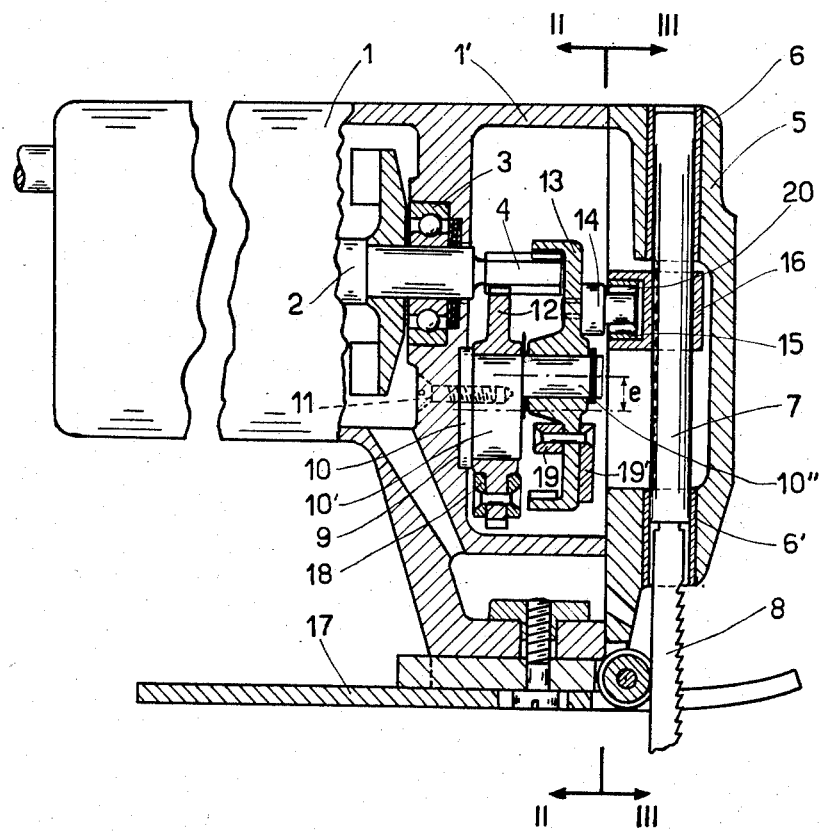
Fig. 1 is a partly diagrammatic, partly sectional side elevational view of a hand power tool according to the present invention.

Referring now to Figs. 1–4, the structure of the invention includes a support means made up in part of a housing 1 in which an unillustrated motor is located, this motor serving as a drive and being adapted to be connected in any suitable way to a source of electricity. The motor includes a shaft 2 which is turnably supported in a ball bearing 3 carried by a transverse wall of the support means, as is evident from Fig. 1. The drive shaft 2 fixedly carries at its right end, as viewed in Fig. 1, a pinion 4, so that the latter rotates with the drive shaft 2. The housing portion 1 acts simultaneously as a handle which enables the operator to freely guide the tool, the latter including a foot plate 17 which rests upon the work material and which may slide on the work material in any desired direction.

The transverse wall of the support means which carries the ball bearing 3 serves as a partition which separates the motor housing 1 from a drive head housing 1' of the support means, the housing 1' housing the drive elements which are driven by the pinion 4 and which transmit the drive to the tool which is carried by the device. The front end of the housing 1' is closed by a front wall 5 which is fixed to the housing 1' in any suitable way such as by screws or the like which are diagrammatically illustrated at the four corners of the front wall 5 in Figs. 2 and 3. Any suitable means may be used for fixing the front wall 5 to the remainder of the housing 1'.

The front wall 5 is provided with a pair of coaxial tubular guides 6 and 6' which are rigid with the front wall 5 and which serve to reciprocatingly guide a cylindrical tool carrying means 7 which is adapted to have any suitable tool such as the saw 8 removably fixed thereto in any suitable way well known in the art and having nothing to do with the present invention. The cutting tool 8 is carried by the tool carrying means 7 at the bottom end thereof.

A balanced drive is housed within the drive head housing 1', and this balanced drive transmits the rotation of the pinion 4 to the reciprocating tool carrying means 7. The right face of the transverse wall which carries the bearing 3 is formed with a recess 9, as viewed in Fig. 1, and the enlarged left end 10 of a shaft is located within the recess 9 and is rigidly fixed with the support means by a screw 11 passing through the transverse wall of the support means into threaded engagement with the shaft. This shaft has in addition to its enlarged end 10 a pair of cylindrical outer face portions 10' and 10" which are eccentrically arranged with respect to each other. The cylindrical face portion 10' extends through and rotatably supports a gear 12 having at its periphery teeth which are directed outwardly away from the axis of the gear 12 which coincides with the axis of the cylindrical face portion 10'. The cylindrical face portion 10" extends through and rotatably supports a gear 13 whose axis coincides with the axis of the cylindrical face portion 10', and the gear 13 has at its outer periphery teeth which are directed inwardly toward the axis of this gear. The portions 10, 10' and 10" all form part of a single unitary member.

The gear 12 meshes directly with the teeth of the pinion 4, and the gear 13 also meshes with a pinion 4, and it will be noted that the gear 13 meshes with the pinion 4 at a side thereof opposite from the side of the pinion 4 which meshes with the gear 12.

In the example illustrated in Fig. 1, the eccentricity $e$ of the cylindrical face portions 10' and 10" with respect to each other is equal to the pitch circle diameter of the pinion 4, and the gears 12 and 13 have the same number of teeth. Of course, if the gears 12 and 13 did not have the same number of teeth, then the eccentricity $e$ would not be equal to the pitch circle diameter of the pinion 4.

Inasmuch as the gears 12 and 13 mesh with opposite sides of the pinion 4, respectively, these gears 12 and 13 rotate in opposite directions, and as a result it is unnecessary to provide a special transmission from one gear to the other in order to rotate these gears in opposed directions.

Any suitable means is provided in order to interconnect the gear 13 with the tool carrying means 7 so that the latter is oscillated during rotation of the gear 13, and in the illustrated example the gear 13 carries a crank pin 14 which is fixed to the gear 13 and which turnably supports a roller 15. This roller 15 may be directly carried by the crank pin 14, or, as shown in the drawings, a suitable friction-reducing means such as the rollers 20 may be interposed between the roller 15 and the crank pin 14.

Figure 3:
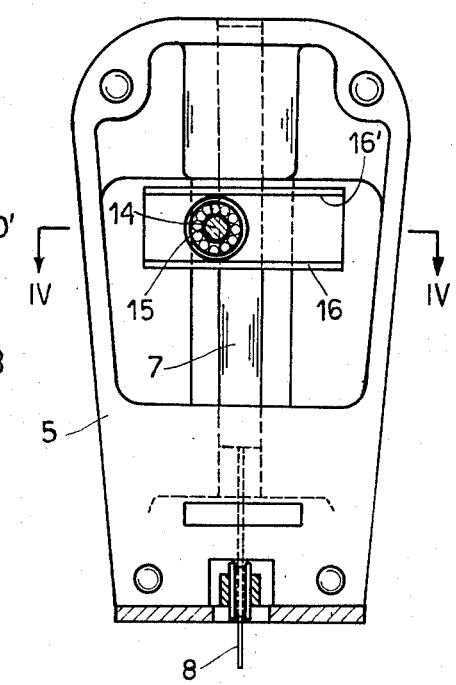
Fig. 3 is a transverse sectional elevational view taken along the line III—III of Fig. 1 in the direction of the arrows.
Figure 4:
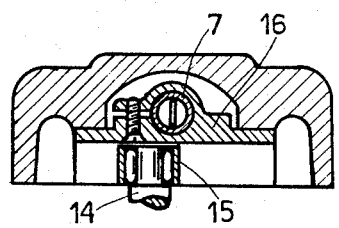
Fig. 4 is a transverse sectional plan view taken along the line IV—IV of Fig. 3 in the direction of the arrows.

An elongated rail 16 is fixed to the reciprocatory tool carrying means 7 and extends transversely thereof, as is shown most clearly in Figs. 3 and 4. This rail has a pair of upper and lower walls extending leftwardly from the vertical wall thereof, as viewed in Fig. 1, so that the rail 16 forms a channel into which the crank pin 14 and roller 15 extend, the roller 15 engaging the inner faces of the upper and lower walls of the rail 16. Thus, the rail 16 provides a path 16' along which the roller 15 reciprocates in a horizontal direction during vertical reciprocation of the rail 16 together with the tool carrying means 7. It should be noted that the structure of the invention is not limited to the use of a transmission 14—16 as described above, and any suitable other transmission for converting the rotation of the gear 13 into axial reciprocation of the tool carrying means 7 may be used, such as, for example, a crank shaft interconnecting elements 13 and 7.

Figure 2:
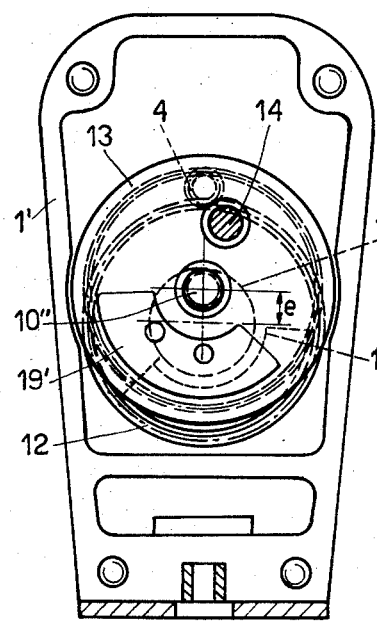
Fig. 2 is a partly sectional transverse elevational view of the structure of Fig. 1 and is taken along line II—II of Fig. 1 in the direction of the arrows.

As is shown in Figs. 1 and 2, the gear 12 has an arcuate mass 18 riveted thereto, and the gear 13 has the masses 19 and 19' riveted thereto, the latter masses also being of arcuate configuration, as shown in Fig. 2. These masses serve to compensate unbalanced forces which would otherwise be set up by the reciprocating tool carrying means 7 together with the tool 8 and the crank pin guide 16. During operation the horizontal force components of the masses 18 and 19 cancel out each other since they rotate at the same angular speeds but in opposite directions, and as is apparent from Fig. 2, the arrangement is such that the masses 18 and 19 pass over each other at the topmost and bottommost parts of their travel. Thus, only the vertical force components of these masses are effective to compensate for the unbalanced forces which would otherwise be set up by the vertically reciprocating elements. The unbalanced force which would arise from the crank pin 14 is compensated by the size of the mass 19, 19' and by the arrangement thereof at a diagrammatically opposed part of the gear 13 from the crank pin 14. The above described structure guarantees a drive which is practically free of vibrations.

Figure 5:
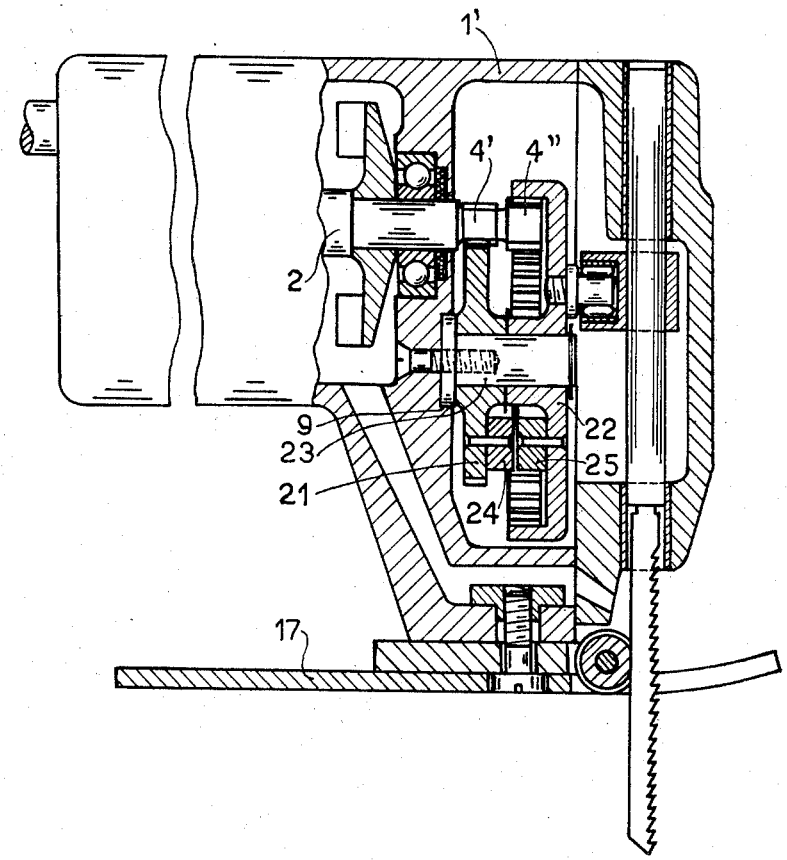
Fig. 5 is a partly diagrammatic, partly fragmentary, partly side sectional elevational view of another embodiment of a hand power tool according to the present invention.

According to the embodiment of the invention which is shown in Fig. 5, the diameter of the gear which has teeth directed inwardly toward its axis and the number of teeth thereof are increased, with respect to the embodiment of Fig. 1, by arranging the oppositely rotating gears coaxially on a common shaft. In this way, the construction and cost of the shaft which supports the oppositely rotating gears are reduced, and in this case the drive pinion must be stepped since the part of the pinion which cooperates with the gear having inwardly directed teeth must have a larger number of teeth than the portion of the pinion which meshes with the smaller gear in order to provide the same transmission ratios between the pinion and the two oppositely rotating gears.

As may be seen from Fig. 5, the shaft 10, 10', 10" is replaced by a simple shaft 23 having an enlarged end fixed to the transverse wall of the support means in the same way as the gear carrying shaft of Fig. 1. This shaft 23 has an elongated cylindrical face portion of constant diameter which extends through and turnably supports both of the gears 21 and 22 which respectively correspond to the gears 12 and 13 of Fig. 1. The smaller gear 21 meshes with the portion 4' of the stepped pinion, and the larger gear 22 which is coaxial with the gear 21 has its inwardly directed teeth in mesh with the larger portion 4' of the stepped pinion. The transmission ratios for both of the gears 21 and 22 are the same since the pinion portion 4" has more teeth than the pinion portion 4'.

In contrast with the embodiment of Fig. 1, the arrangement of the two gears 21 and 22 coaxially with respect to each other on a shaft portion of constant diameter enables the masses 24 and 25, respectively fixed to the gears 21 and 22 and respectively corresponding to the above-described masses fixed to the gears 12 and 13, to be located at the same radial distance from the common axis of the gears 21 and 22. Thus, with this arrangement a maximum compensation for any unbalance is provided. The gear 22 reciprocates the tool carrying means 7 in the same way with the embodiment of Fig. 5 that the gear 13 reciprocates element 7 with the embodiment of Fig. 1.

With the above-described structures of the invention, the arrangement is such that the shaft which carries the oppositely rotating gears is located beneath the motor shaft 2 in the space between the latter and the foot plate 17. Without in any way changing the essence of the invention or the principle of operation thereof, the arrangement can be such that the shaft which carries the oppositely rotating gears is located above the motor shaft displaced at an angle of 180° from the position of the gear carrying shafts respectively shown in Figs. 1 and 5. Thus, it is possible with such an arrangement, if desired, to decrease the distance between the motor housing 1 and the foot plate. However, in this event the drive head housing 1' must extend to a somewhat higher elevation than that shown in the drawings in order to accommodate the balanced drive structure.

It will be understood that each of the elements described above, or two or more together, may also find a useful application in other types of power tools differing from the types described above.

While the invention has been illustrated and described as embodied in hand power tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hand power tool, in combination, support means; elongated tool carrying means reciprocatorily carried by said support means; drive means carried by said support means and including a drive shaft; a pinion fixed to said drive shaft for rotation therewith; a first gear supported for rotation about its axis by said support means and having at its periphery teeth directed outwardly away from the axis of said first gear and meshing with said pinion; a second gear supported for rotation about its axis by said support means and having at its periphery teeth directed inwardly toward the axis of said second gear and meshing with said pinion at a side thereof opposite from the side which meshes with said first gear; and motion transmitting means interconnecting one of said gears with said tool carrying means for reciprocating the latter during rotation of said one gear, the other of said gears cooperating with said one gear to compensate unbalanced forces.

2. In a hand power tool, in combination, support means; elongated tool carrying means reciprocatorily carried by said support means; drive means carried by said support means and including a drive shaft; a pinion fixed to said drive shaft for rotation therewith; a first gear supported for rotation about its axis by said support means and having at its periphery teeth directed outwardly away from the axis of said first gear and meshing with said pinion; a second gear supported for rotation about its axis by said support means and having at its periphery teeth directed inwardly toward the axis of said second gear and meshing with said pinion at a side thereof opposite from the side which meshes with said first gear; and motion transmitting means interconnecting said second gear with said tool carrying means for reciprocating the latter during rotation of said second gear.

3. In a hand power tool, in combination, support means; elongated tool carrying means reciprocatorily carried by said support means; drive means carried by said support means and including a drive shaft; a pinion fixed to said drive shaft for rotation therewith; a first gear supported for rotation about its axis by said support means and having at its periphery teeth directed outwardly away from the axis of said first gear and meshing with said pinion; a second gear supported for rotation about its axis by said support means and having at its periphery teeth directed inwardly toward the axis of said second gear and meshing with said pinion at a side thereof opposite from the side which meshes with said first gear, said second gear having the same number of teeth as said first gear and the axis of rotation of said second gear being spaced from the axis of rotation of said first gear by a distance equal to the pitch circle diameter of said pinion; and motion transmitting means interconnecting said second gear with said tool carrying means for reciprocating the latter during rotation of said second gear.

4. In a hand power tool as recited in claim 3, said support means including a stepped shaft having a pair of cylindrical outer face portions of different diameters respectively supporting said first and second gears for rotation, and said cylindrical face portions being eccentrically offset with respect to each other by a distance equal to the distance between the axes of rotation of said first and second gears, respectively.

5. In a hand power tool, in combination, support means; elongated tool carrying means reciprocatorily carried by said support means; drive means carried by said support means and including a drive shaft; a pinion fixed to said drive shaft for rotation therewith; a first gear supported for rotation about its axis by said support means and having at its periphery teeth directed outwardly away from the axis of said first gear and meshing with said pinion; a second gear supported for rotation about its axis by said support means and having at its periphery teeth directed inwardly toward the axis of said second gear and meshing with said pinion at a side thereof opposite from the side which meshes with said first gear, said second gear being coaxial with said first gear and having a greater number of teeth than said first gear; and motion transmitting means interconnecting said second gear with said tool carrying means for reciprocating the latter during rotation of said second gear.

6. In a hand power tool as recited in claim 5, said support means including a shaft having an elongated cylindrical portion of constant diameter passing through and turnably supporting said first and second gears.

7. In a hand power tool as recited in claim 2, said support means including a wall formed with a recess in one face thereof and a shaft having an enlarged end located in said recess and an elongated portion extending from said end of said shaft through said first and second gears and turnably supporting the latter, and at least one screw fixing said shaft to said wall.

References Cited in the file of this patent
UNITED STATES PATENTS
2,501,631   Oschwald _____ Mar. 21, 1950